(12) United States Patent
Meister et al.

(10) Patent No.: US 11,467,023 B2
(45) Date of Patent: Oct. 11, 2022

(54) WINDSHIELD STRUCTURE FOR A LOAD RECEIVING ARRANGEMENT IN A WEIGHING BALANCE

(71) Applicant: Mettler-Toledo GmbH, Greifensee (CH)

(72) Inventors: Beat Meister, Nänikon (CH); Alice Buchmann, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 150 days.

(21) Appl. No.: 17/166,316

(22) Filed: Feb. 3, 2021

(65) Prior Publication Data

US 2021/0247228 A1      Aug. 12, 2021

(30) Foreign Application Priority Data

Feb. 11, 2020   (EP) ..................................... 20156610

(51) Int. Cl.
*G01G 21/28*      (2006.01)
*G01G 21/22*      (2006.01)

(52) U.S. Cl.
CPC ........... *G01G 21/286* (2013.01); *G01G 21/22* (2013.01)

(58) Field of Classification Search
CPC ....... G01G 21/22; G01G 21/28; G01G 21/286
See application file for complete search history.

(56) References Cited

U.S. PATENT DOCUMENTS

| | | | |
|---|---|---|---|
| 4,465,152 A | 8/1984 | Schmitter | |
| 6,557,391 B2 | 5/2003 | Lüchinger | |
| 6,603,081 B2 | 8/2003 | Lüchinger | |
| 6,835,901 B2 | 12/2004 | Lüchinger | |
| 9,024,213 B2 | 5/2015 | Izumo et al. | |
| 2002/0038567 A1* | 4/2002 | Luchinger | G01G 21/28 73/1.13 |
| 2013/0292192 A1 | 11/2013 | Jaia | |
| 2016/0238434 A1 | 8/2016 | Zhao | |

* cited by examiner

*Primary Examiner* — Randy W Gibson
(74) *Attorney, Agent, or Firm* — Standley Law Group LLP; Jeffrey S. Standley; Stephen L. Grant

(57) ABSTRACT

A windshield structure (30) is provided for a weighing balance (100) having a base body (48), a floor (46), and a load receiving arrangement (11). The base body and the floor, which is attached to the base body, are positioned horizontal to the ground surface. The load receiving arrangement has a load receiver, with the windshield structure arranged below the load receiver. The windshield structure has a central portion and a circumferential portion that surrounds the central portion. The central portion also has a topological surface with a plurality of alternating hills (32) and valleys (31) which aid in regulating airflow below the load receiver.

14 Claims, 6 Drawing Sheets

WINDSHIELD STRUCTURE FOR A LOAD RECEIVING ARRANGEMENT IN A WEIGHING BALANCE

CROSS-REFERENCE TO RELATED APPLICATIONS

This patent application claims the benefit of priority to European Patent application EP 20156610.6, filed on 11 Feb. 2020, which is incorporated by reference as if fully recited herein.

TECHNICAL FIELD

The invention concerns a weighing balance, specifically a laboratory weighing balance, having a load receiving arrangement, and a windshield structure for such a load receiving arrangement.

BACKGROUND ART

A typical high-precision weighing device generally used in a laboratory set-up is known, for instance from U.S. Pat. No. 4,465,152. The precision scales disclosed therein have a weighing chamber being, of course, closed during weighing and thus protecting the weighing dish from outside air currents. In the weighing chamber, a weighing dish supports from below a received load to be weighed against gravity. A bottom plate, part thereof below the weighing dish and forming a floor below and not contacting the weighing dish has a bore which accommodates a pin with play, which pin supports the weighing dish and resting on an extension to provide a load transfer centrally and vertically from the weighing dish. A ridge extending parallel to a glass front of the housing of the weighing chamber provides some lateral coverage for the weighing dish, although being closer to a number of slots allowing relatively free air circulation between the weighing chamber and a chamber below. In this prior art arrangement, air movement takes place without affecting the weighing dish to any substantial extent. The ridge has a further function in preventing spilled material from entering the chamber underneath the weighing chamber.

In another weighing device disclosed in EP 2 530 441 A1, a circular spill-protection dike is provided on the weighing chamber floor to avoid spillage of hazardous and corrosive test substances from entering a through-hole meant for passing the load transfer pin of the weighing dish. The circular spill-protection dike is arranged radially closer to the through-hole on the floor below the weighing dish. One or more coaxially arranged windproof walls surround the weighing dish to act as windshield against lateral airflow.

Although, there have been measures taken in the art to shield the weighing operation of a high-precision weighing device against wind effects, concerning minute mass measurement there still exists disturbing effects on the measured weight value in the form of error factors resulting from turbulent airflow.

SUMMARY OF INVENTION

In view of the above problems associated with prior art devices, it is an object of the present invention to provide further improvements in a weighing balance and achieve a better combination of improved measurement accuracy and reduced waiting time between load reception on the load receiver and measurement.

This object is achieved by a further development of a weighing balance having a base body positioned horizontal to a ground surface, a floor attached to a base body and positioned horizontal to the base body, and a load receiving arrangement. The load receiving arrangement comprising a load receiver having a grid structure for receiving a load to be weighed, a windshield structure seated on the floor and positioned below the load receiver in a non-contacting manner and surrounding at the grid structure of the load receiver. The windshield structure comprising a circumferential portion and a central portion. The central portion of the windshield structure is essentially characterized by a topological surface comprising a plurality of alternating hills and valleys to reduce airflow below the load receiver.

In the framework of the invention it was recognized that it is effectively impossible to exclude air flow/fluctuations as error factors in minute mass measurement. This is because an operation to place a sample into the weighing chamber of the weighing device inevitably creates airflow, which may maintain longer than the loading operation itself. Further airflows might be generated by temperature gradients in different regions of the weighing device. While such airflows existing below the load receiver may not be completely prevented, they may still be guided so as to minimize their influence on the measured weight value of the load. By way of imposing flow restrictions and guidance by the topological surface, that is the surface morphology according to this invention, the lateral flow space for airflow is restricted leading to a beneficial effect of diminishing the impact of arising airflows on the measured weight value.

It is understood that the circumferential portion does not need to fully surround the load receiver circumferentially, but should preferably, in terms of angular extension, surround the load receiver preferably at least by 180°, in particular by at least 240°.

The distribution of hills and valleys, the form of the hills and valleys are not particularly restricted. The hills and valleys also can be of variable configuration and form or they can be irregularly distributed over the central portion. Additionally, the height level of respective valleys and respective hills may can be configured as different from one another. Further, it is not necessary that the entire central portion needs to be composed of said topological structure, but the central portion needs to comprise a plurality of alternating hills and valleys.

Further preferred arrangements are summarily described below. In a preferred embodiment, the topological surface of the central portion is anisotropic so as to accommodate load receivers of different grid structures. This arrangement additionally facilitates guidance to airflow in the form of channelling across the ground portion. To this end, it is also provided in a preferred embodiment that the guidance of the topological structure reduces airflow along a valley across the ground portion passing closer to its center than to its border.

In a further preferred embodiment, the topological surface comprising the alternating hills and valleys with hill/valley height level difference between hill and valley of more than 1.2 mm and/or less than 16 mm. Further, the topological surface locally comprising an adjacent hill/valley height level difference between hill (hill top) and valley (valley bottom) of more than 1.2 mm, preferably more than 1.6 mm, in particular 2.0 mm and/or less than 16 mm, preferably less than 12 mm, in particular less than 8.0 mm. It is understood that "locally" does not mean locally everywhere, but that the topological surface comprises local areas in which said height level difference is given.

In a preferred way, an average of height level difference of adjacent hill/valley combinations is larger than 1.2 mm and/or lower than 16 mm. Further, it is preferred when globally the average of height level difference of adjacent hill/valley combinations of the topological surface is larger than 1.2 mm, preferably than 1.6 mm, in particular than 2.0 mm, and/or lower than 16 mm, preferably lower than 12 mm, in particular lower than 8.0 mm. In particular, it is preferred when there are local portions with height level difference of more than 1.5%, preferably more than 2.5% of the effective area of the load receiver, and/or less than 20%, in particular less than 10% thereof. It is also preferred that the average height level difference is more than 1.5%, in particular more than 2.5%, and/or lower than 20%, in particular lower than 10% of said effective area of the load receiver. In a further preferred embodiment, a ratio of size higher than the average height level of the topological surface to area of the load receiver lower than the average height level of the topological surface is larger than 1/3, preferably larger 3/8, in particular larger than 3/7, and/or lower than 3/4, preferably lower than 2/3, in particular lower than 5/8. The average height level of the topological surface is just the arithmetical mean height, in integral form $\langle h \rangle = \iint dx \cdot dy \cdot h(x, y)$ taken over the area of the topological surface.

In a preferred embodiment, the topological surface comprises valleys extending at least partially linearly. Due to this arrangement, airflow can laterally be channelled more smoothly, reducing effects of change of flow direction.

In a preferred arrangement, the topological surface comprises at least three hills. Preferably, the topological surface comprises at least four hills. It is also preferred that there is at least one direction orthogonal to gravity where, in a cross-section along said direction the average spatial frequency of alternating hills/valleys in 1/cm is larger than 2/3, preferably larger than 1, in particular larger than 4/3, and/or lower than 4.0, in particular lower than 3.5, in particular lower than 3.0. To exemplify this, if for instance a length along a cross-section of the structure of 10 cm is considered, and there are seven hills within said length, every hill giving two alternations (valley to a hill and from said hill to the next valley), the average spatial frequency in 1/cm would be 1.4.

In a preferred way, the hills and valleys of the topological surface and the circumferential portion are integrally formed as a single unit. In addition, at least some of hills and valleys, preferably all of them, are physically connected in the topological surface, and preferably made of one piece. This aids in keeping the overall windshield structure simple while maintaining the desired spacing within the topological surface.

In an advantageous embodiment, at least a pair of hills adjoining one another comprises a chipped portion for creating additional spacing between the load receiver and the windshield structure. This arrangement helps in preventing any contact between the load receiver, particularly a clip on the load receiver, and the hills on the windshield structure.

In a preferred way, the circumferential portion comprises a pair of walls extending in transverse direction of the windshield structure and located opposing each other with the alternate valleys and hills located in between the two opposing walls. Each of the walls are of arcuate configuration for providing additional room to accommodate sample receivers that are marginally larger in size than size of the load receiver, and for easing removal of the weighing pan from the load receiving arrangement.

Preferably, the circumferential portion comprises ramp portions and said ramp portions having a ramp portion on front and at least two ramp portions on its sides such that the two ramp portions on the sides extend in longitudinal direction of the windshield structure and the ramp portion on front extend in lateral direction of the windshield structure.

Advantageously, the windshield structure further comprises recesses extending in the longitudinal direction of the windshield structure and located on either side of the topological surface separating the ramp portions on sides from the topological surface. The recesses are inwardly recessed for smooth conduct of fluids and for facilitating easy cleaning.

In a preferred arrangement, the circumferential portion further comprises a plateau located in between the ramp portion on front and the topological surface such that weights or other weighing goods that require thermal stabilization are received on the plateau.

In an advantageous embodiment, the windshield structure further comprises a collecting basin located opposing the ramp portion on front. Particularly, the collecting basin is located on the backside of the windshield structure. The collecting basin is configured for receiving the fluid conducted through the recesses.

In a preferred embodiment, at least part of the load receiver comprising the grid structure having open areas formed by a plurality of spaced apart grid bars. In a further preferred embodiment, at least part of the load receiver is discontinuous at its upper surface. Preferably, it has open areas allowing airflow from above the load receiver to below the load receiver (i.e. versus the central portion) and has in particular a grid structure. On the one hand side, the effective contact area between the load to be weighed and the load receiver can be reduced. On the other hand, airflow through the load receiver in direction against gravity becomes possible, and floatation/uplift effects are reduced. In a preferred embodiment, the grid bars of the load receiver have a cross-section with a tapering towards the upper surface, for instance with an essentially triangular structure, which reduces the effective contact area and also favours downward flow of any spillage. Preferably, the ratio of open areas to non-open areas of the grid structure in terms of area dimension is larger than 0.6, preferably larger than 1.0, in particular larger than 1.6. In a preferred embodiment, the effective contact area of the support portion is in majority generated by such grid bars, running in particular in parallel to each other. Mounted in the weighing chamber, a preferred running direction is parallel to the rear wall of the weighing chamber separating the load receiving arrangement from the weighing mechanism of the weighing balance. A grid structure is also allowed to mount holding arrangements particularly designed to receive certain types of irregularly formed or very small bins or vessels containing material to be weighed.

In a preferred arrangement of the weighing balance, the open areas of the grid structure correspond in their arrangement with the hills of the topological surface, the valleys correspond in their arrangement with the grid bars of the grid structure. There is a correlation between grid structure and topological surface providing larger overlap between grid bars and valleys, respectively and between open areas and hills, than their overlap the other way round. In a further preferred embodiment, a valley of the topological surface follows the run of a bar of the grid structure. It is understood that the valley does not need to follow the run over the full length of the extension of the bar, in particular the run of a valley might be interrupted by structural components of the load receiver carrying for instance the grid bars. Preferably, a plurality, in particular a majority of grid bars of the grid structure are followed in their run by valleys of the topological surface. In a further preferred embodiment, one, preferably a plurality, in particular a majority or even all grid bars are at least over a portion of their run, in particular the majority portion of their run, embedded in valleys of the topological surface. In this connection, it is preferred that the topological surface comprises one or more hills protruding beyond the height level of the downside face of the bars of the grid, in particular by more than 10%, preferably by more than 15%, in particular by more than 20% of the bars' height extension. Of course, when the upper face of the grid bars form the contact area for received loads, the hills may not reach the height level thereof, and are spaced by safety spacing of preferably more than 0.8 mm, further preferably more than 1.2 mm, in particular more than 1.6 mm, or more below said height level. In a further preferred embodiment, the topological surface between adjacent hills at least partially adapts to the form and run of a bar of the grid, in particular, it is preferred that, seen in a cross-section of a grid bar and the valley following its run, the root mean square deviation of the distance between the grid bar and the topological surface in the region between two adjacent hills enclosing the grid bar divided by the arithmetic mean of said distance is lower than ⅔, preferably lower than ½, in particular lower than ⅓, preferably even lower than ¼. It is preferred that this condition is present for at least 20% of the overlap region, preferably the majority thereof. Preferably, the vertical distance between the load receiver, in particular the grid bars and the hill (hill top) height level is not larger than twice the distance between two adjacent hills, in particular than said distance, and/or not larger than 1.6 cm, preferably than 1.2 cm, in particular than 0.8 cm, even 0.4 cm. Preferably, the vertical distance between the load receiver, in particular the grid bars and the hill (hill top) height level is not larger than twice the distance between two adjacent hills, in particular than said distance, and/or not larger than 1.6 cm, preferably than 1.2 cm, in particular than 0.8 cm, even 0.4 cm. Preferably, the vertical distance between the load receiver, in particular the grid bars and the valley (valley bottom) height level is not larger than twice the distance between two adjacent valleys, in particular than said distance, and/or not larger than 2.0 cm, preferably than 1.6 cm, in particular than 1.2 cm, even 0.8 cm. This allows backflows resulting from downward airflows with less detrimental effect. For the above discussed arrangements of grid structure and their correlation with the topological surface, in particular embedding in valleys of the topological surface, major flow components of a channelling of the topological surface is directed parallel to grid bars and not perpendicular thereto, such that the risk of inducing turbulence transverse to the extending direction of the bars is reduced. Moreover, once embedding also in height direction is accomplished, the hills of the topological surface have additional windshield effect against transverse flows. Vertical flows may be deflected and run upwards along the slope from valley to hill, to have then lower impact on the load receiver. However, the above relative arrangement of grid structure to topological surface is only preferred embodiments. Even if hills are not long-drawn but also irregularly arranged, the guiding has its advantages in particular regarding handling of vertical flows. Preferably, there is at least no main channelling across the ground portion and transverse to the grid bars forming the upper surface of the load receiver.

In a preferred embodiment, the circumferential portion is marginally higher than the topological surface. In a further preferred embodiment, the height level of the circumferential portion is, at least partly, higher than the average height level of the valleys, preferably by at least 30%, in particular by at least 60% of the average height level difference between hills and valleys, more preferably higher than the average height level of the hills, and in particular reaching or superating the height level of the upper surface of the load receiver. This makes the windshield effect of the circumferential portion more effective.

In an advantageous embodiment, the circumferential portion surrounding the grid structure of the load receiver is higher than the grid bars. In a further preferred embodiment, the height level of the circumferential portion is, at least partly, higher than the average height level of the valleys, preferably by at least 30%, in particular by at least 60% of the average height level difference between hills and valleys, more preferably higher than the average height level of the hills, and in particular reaching or superating the height level of the upper surface of the load receiver. This makes the windshield effect of the circumferential portion more effective.

In another preferred embodiment, the load receiver comprises two sidebars spaced apart and held together by the grid structure with each of the two sidebars having a substantially L-shaped configuration.

In a preferred way, the two sidebars connect the load receiver to the weighing mechanism. Such embodiment corresponds to a load receiving arrangement for lateral load transfer, and the load is not transferred through a central vertical column extending from the support portion through an opening in the ground portion. Such an arrangement also influences the airflow favourably at the ground portion by having preferably a closed ground portion (without through-hole(s) connecting to the outside of the weighing chamber).

In a preferred embodiment, a radial outer portion of the circumferential portion has a ramp structure with ramp angle in particular lower than 60°, preferably lower than 45°, in particular lower than 30°, and/or higher than 10°, preferably higher than 14°, in particular higher than 18°. There can be a spacing between the radial inner portion of the circumferential portion and the topological surface, said spacing being in particular adapted to receive structural components of the load receiver providing load transfer to the weighing mechanism of the weighing balance.

It is understood that said ramp structure does not need to fully circumferentially surround the load receiver. For instance, a weighing chamber is formed by a front wall, two side walls, a rear wall, a top wall, and the floor. The rear wall separates the weighing chamber from the weighing mechanism of the weighing balance. The circumferential portion could be placed adjacent to the rear wall and has for instance ramp structures facing the side walls and the front wall of the weighing chamber.

In an advantageous embodiment, the load receiving arrangement of the weighing balance configured as hitherto described comprises a load receiver connected to a weighing mechanism, the load receiving arrangement may comprise one or more recesses to accommodate therein the two side bars in a non-contacting manner.

In another advantageous embodiment, the windshield structure of the weighing balance configured as hitherto described comprises the central portion, which comprises the topological surface and the circumferential portion formed integrally as a single unit.

BRIEF DESCRIPTION OF DRAWINGS

Further features, details, and advantages of the invention can be taken from the subsequent description with reference to the accompanying figures, wherein identical parts are identified by identical reference numbers and wherein.

DETAILED DESCRIPTION OF EMBODIMENTS

Figure 1:
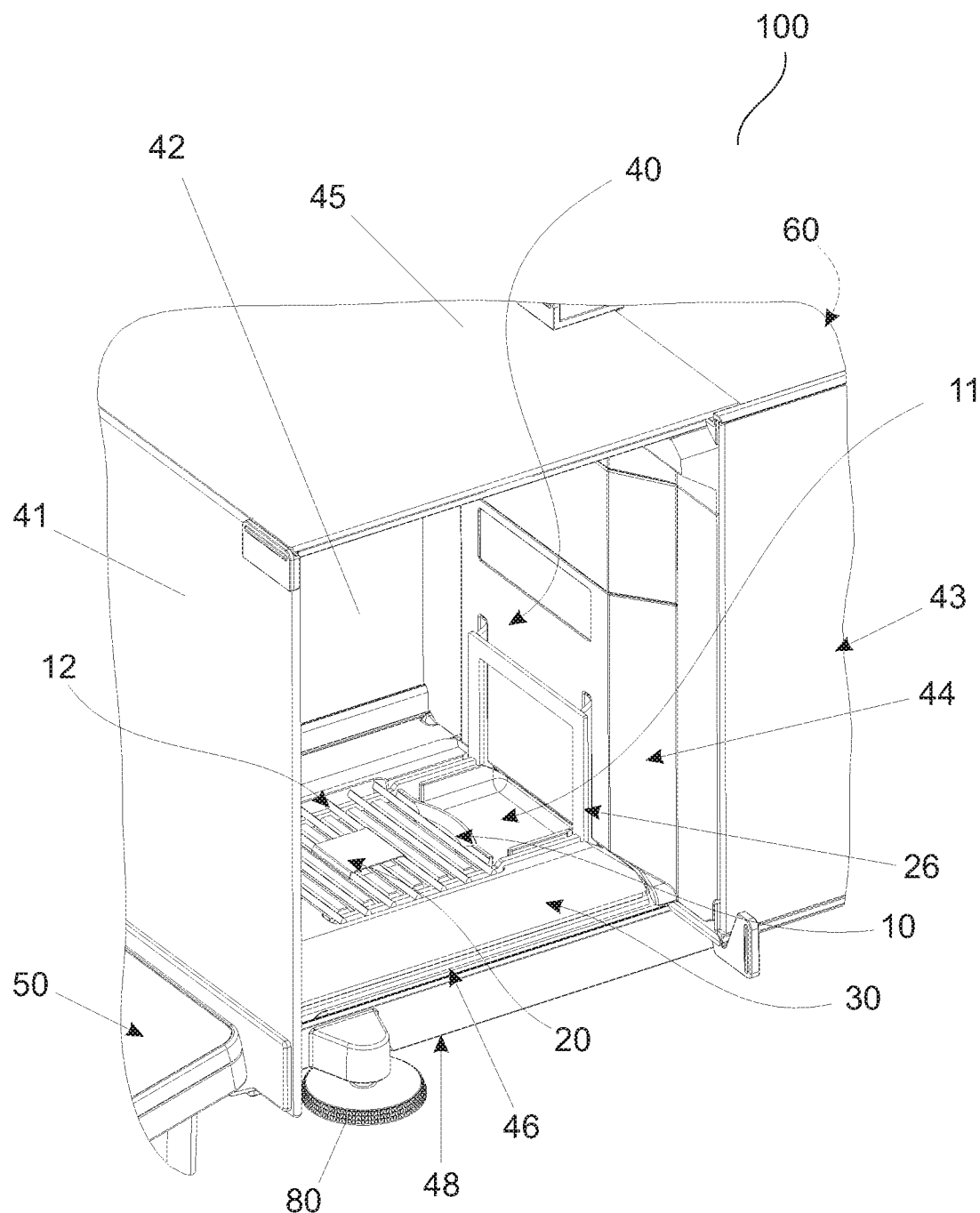
FIG. 1 shows, in a perspective view, a weighing balance having a load receiving arrangement surrounded by a weighing chamber.

The basic structure of an exemplary weighing balance 100, as shown in FIG. 1, is of a type well-known in the art, having a base body 48, a load receiving arrangement 11, and a weighing chamber 40 formed by floor 46, transparent front wall 41, transparent side walls 42 and 43, transparent top wall 45, and rear wall 44. Rear wall 4 separates the weighing chamber 40 from the weighing mechanism 60 arranged and housed on the other side of rear wall 44 (and not visible in FIG. 1, this being indicated by broken line of the arrow of reference numeral 60). Part of the floor 46 is omitted in FIG. 1, such that a height-adjustable foot 80 of the weighing balance 100 is visible. The side wall 43 facing the viewer in FIG. 1 is movable in a fore-and-aft direction so as to open and close the weighing chamber 40, and is shown in a retracted position, giving access to the interior of weighing chamber 40, such that a load to be weighed can be introduced onto a load receiving arrangement 11, and more specifically onto a load receiver 20, which is provided in this embodiment as a grid structure 12. Load receiver 20 is connected to the weighing mechanism 60 via a pair of sidebars 26 having a substantially L-shaped configuration. In the exemplary embodiment shown in FIG. 1, the load is transferred to the weighing mechanism 60 laterally and not vertically downwards through floor 46 of weighing chamber 40. Abutting the front wall 46 and outside the weighing chamber 40 is an operator panel 50 for operating the weighing balance 100. The weighing balance 100 shown in the exemplary embodiment of FIG. 1 is a high-precision laboratory scale with weighing accuracy better than 0.001 mg.

Those features of the weighing balance 100 described with reference to FIG. 1 by now are known from weighing balances of the lateral load transfer type, as for instance disclosed in EP 1 195 586 A1. The content of said document is incorporated in the present application regarding the subject of possibilities for the coupling of sidebars 26 to the weighing mechanism 60 as well as to the coupling of calibration weights to the weighing mechanism 60, which for instance, can be arranged in base body 48 of the floor 46 of the weighing chamber 40, as it is the case of the embodiment shown in FIG. 1, although not displayed. However, embodiments of the present invention are not restricted to the embodiments shown in EP 1 195 586 A1, and the coupling of sidebars 26 to the weighing mechanism 60 can be configured in other known ways, which is outside the scope of the instant invention.

For the subsequent discussion, regarding directions, while the height direction is referenced with respect to the direction of gravity (-g), the extension direction of the lateral part of the sidebars 26 is named the length direction, the length direction being thus the direction connecting rear wall 44 with front wall 41, while the direction orthogonal to gravity and length direction is named transverse direction, being the connection direction between side walls 42 and 43 (in the closed state) of the weighing chamber 40. A plane being generated by length and transverse direction and being orthogonal to gravity is named projection plane.

In the embodiment shown in FIG. 1, the surface immediately below the load receiver 20 is not the floor 46 of the weighing chamber 40, but the central portion 10 of the windshield structure 30 placed in the weighing chamber 40 and being arranged in the height direction, between the load receiver 20 and the floor 46.

Figure 2:
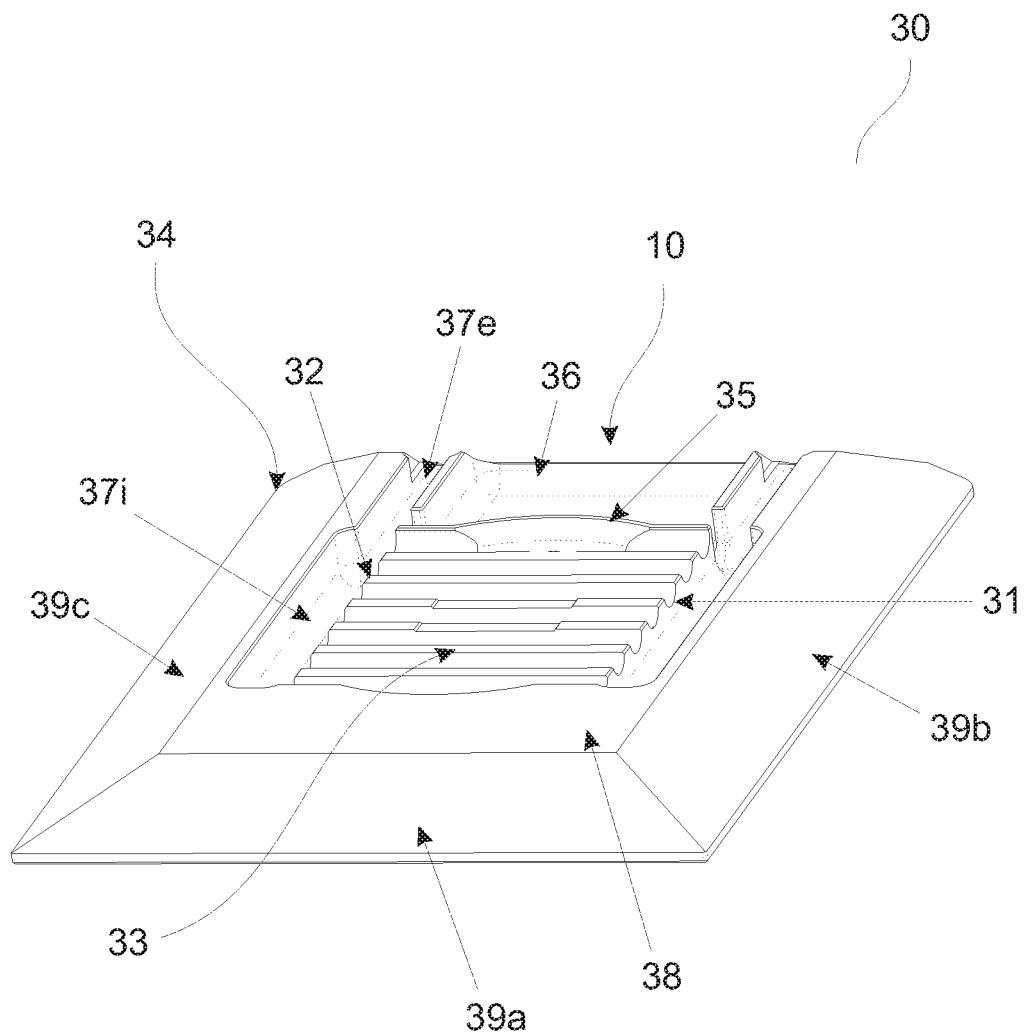
FIG. 2 shows, in a perspective view, a windshield structure of the weighing balance shown in FIG. 1.
Figure 3:
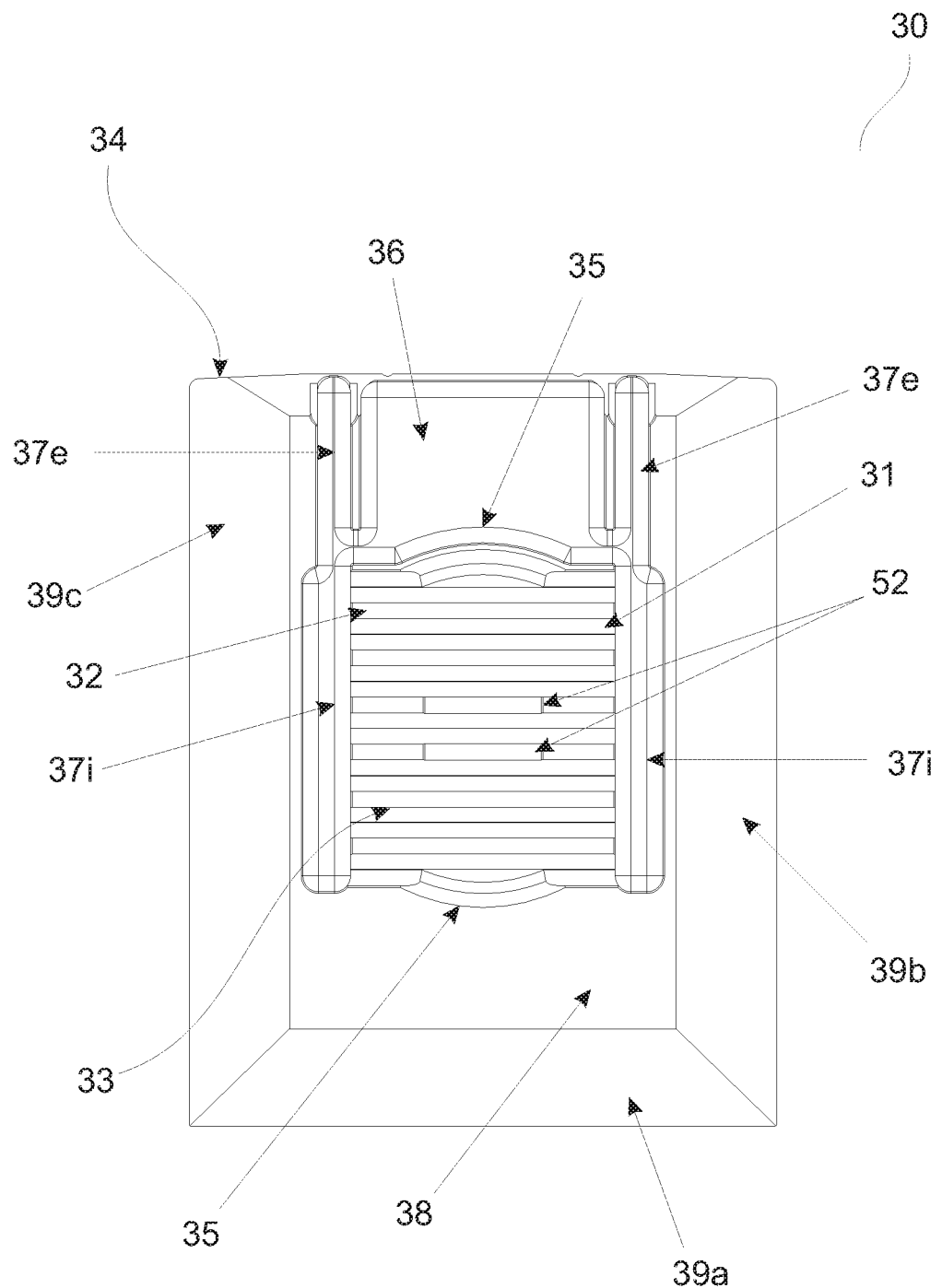
FIG. 3 shows, in a top view, a windshield structure of the weighing balance shown in FIG. 2.

In addition to the load receiver 20, the load receiving arrangement 11 of the instant invention further comprises a windshield structure 30 seated on the floor 46 and positioned below the load receiver 20 such that the load receiver 20 is held in a non-contacting manner above the windshield structure 30. The windshield structure 30 will hereinafter be described with specific reference to FIG. 2. The base form of the windshield structure 30 is that of a truncated pyramid. The windshield structure 30 comprises a central portion 33 and a circumferential portion 34.

The three sides of circumferential portion 34 to face front wall 41 and side walls 42, 43 of weighing chamber 40 form ramp portions 39*a*, 39*b*, and 39*c* respectively with a ramp angle of roughly 24°. Any airflow close to height level of floor 46 and directed towards the centre is, thus, guided to obtain a direction component against gravity. There is provided a ramp portion on the front 39*a*, and ramp portion on the sides 39*b*, 39*c*. The two ramp portions on the sides 39*b*, 39*c* extend in longitudinal direction of the windshield structure 30 while the ramp portion on the front 39*a* extend in the lateral direction of the windshield structure 30. The upwardly sloping ramp portions 39*a*, 39*b*, and 39*c* culminate on the plateau 38. The plateau 38, the adjoining ramp portions 39*a*, 39*b*, and 39*c* and part of circumferential portion 34 radially adjacent to but not contacting the load receiver 20 termed as wall 35 act, therefore, as a first line of defence against turbulent airflow for the load receiver 20. The height level of plateau 38 is therefore also called shield-height H. The plateau 38 located in between the ramp portion on the front 39*a* and the topological surface 33 is configured as a flat surface for receiving weights or other such weighing goods that require thermal stabilization.

The centre of the windshield structure 30 is recessed with respect to plateau 38, and comprises a central portion 10 being, in the projection plane, arranged within the area beneath the load receiver 20 in the projection plane. The central portion 33 comprises a topological surface 33 formed by a plurality of alternating hills 32 and valleys 31. Both the hills 32 as well as the valleys 31 in between run, in this embodiment, along the transverse direction. Hills 32 and valleys 31 alternate, thus, when seen along the length direction. Between said topological surface 33 and plateau 38 along with the sides of the ramp portions 39*a*, 39*b*, and 39*c*, a recess portion 37*i* is formed to accommodate the free horizontal end portions of sidebars 26, and said recesses 37*i* is continuous with recesses 37*e* which are, seen in the projection plane, outside of the central portion 33. The recesses 37*i*, 37*e* extend in the longitudinal direction of the windshield structure 30 and are located on either side of the topological surface 33. The recesses 37*i*, 37*e* separate the ramp portions (39a, 39b, 39c) from the topological surface 33. The recesses 37i, 37e are inwardly recessed for smooth conduct of fluids and for facilitating easy cleaning and for wiping off spillage.

The collecting basin 36 of the windshield structure 30 faces the rear wall 44 of weighing chamber 40 when the windshield structure 30 is placed in the weighing chamber 40. The windshield structure 30 has a form which is essentially complementary with the form of the rear wall 44, such that it can fit in to alignment with said rear wall 44. The circumferential portion 34 comprises a pair of walls 35 extending in transverse direction of the windshield structure 30 and located opposing each other with the alternate valleys 31 and hills 32 located in between the two opposing walls 35. Each of the walls 35 are of arcuate configuration for providing additional room to accommodate sample receivers that are marginally larger in size than size of the load receiver 20, and for easing removal of the load receiver 20 from the load receiving arrangement 11. The walls 35 extends transversally and arranged between recesses 37i and 37e and between recess 37i and the plateau 38, when seen in length direction. It may also be seen from FIG. 2, that one of the walls 35 is arranged between the topological surface 33 and collecting basin 36. The walls 35 further acts as a shield against airflow close to the floor 46 and directed towards the ramp portion on front 39a. It must be noted that the collecting basin 36 is located opposing the ramp portion on the front 39a. The collecting basin 36 is configured for receiving fluid that is conducted through the recesses 37i, 37e.

Figure 5:
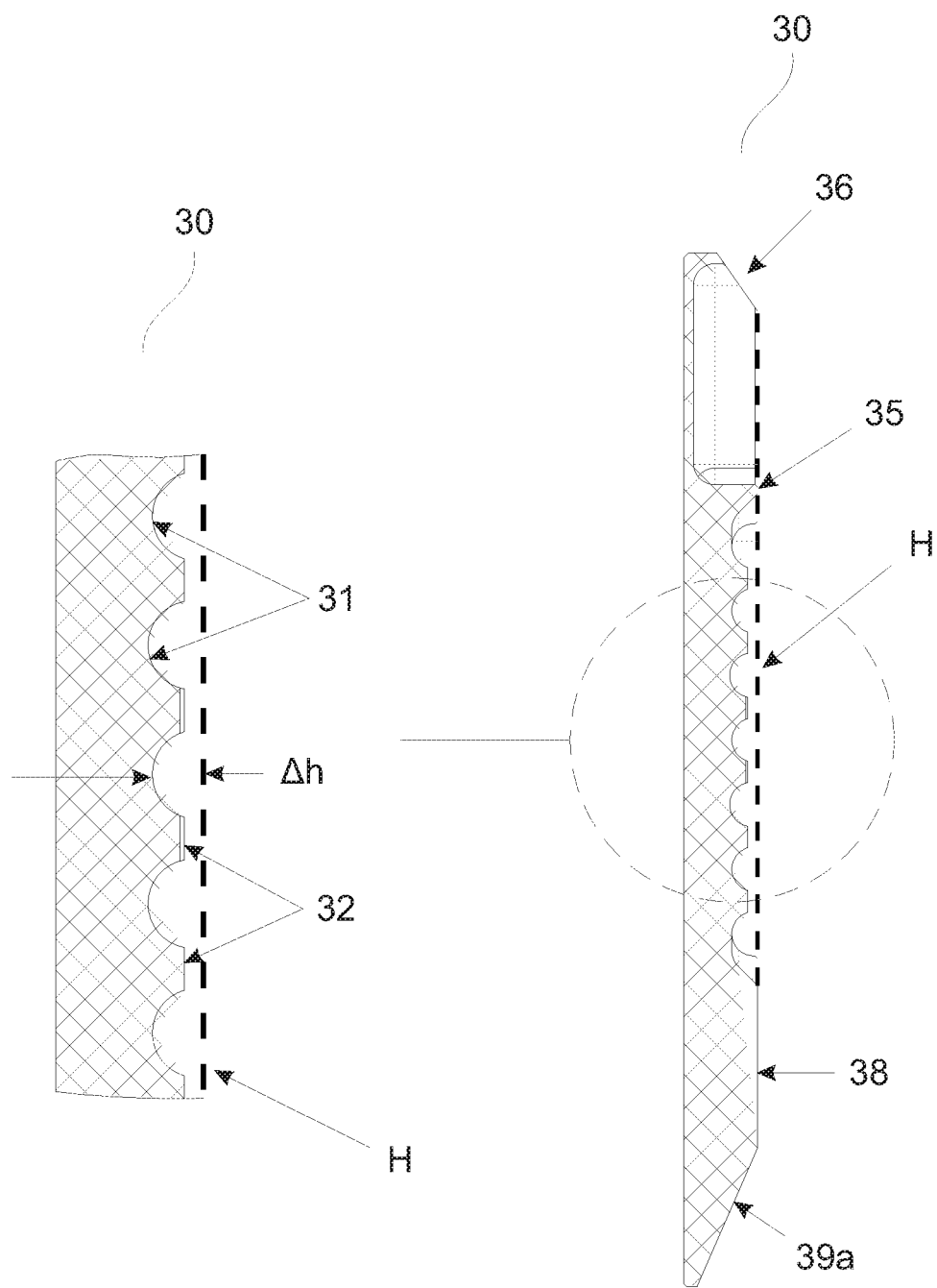
FIG. 5 shows a sectional view of the insert shown in FIG. 2, together with a central portion thereof in enlarged manner.

The height level of the hills 32 (height level of top of the hills 32) is, in this embodiment, below the shield-height H. In FIG. 5, which is a cross-sectional view along the length direction and centrally with respect to the transverse direction, said shield-height H is indicated with a broken line connecting the plateau 38 to the side of ramp 39a with wall 35. In the enlarged representation on the left hand side in FIG. 5, one can recognize a spacing between top of hills 32 and said shield-height H (represented by a broken line). Further, one can recognize a spacing between bottom of valleys 31 and shield-height H (represented by a broken line), which is, in the shown embodiment, in the range of few mm, particularly about 3.5 mm. The surface area (extension of the area of load receiver in the projecting plane) is, in this embodiment, about 36 cm2, but can, of course, be smaller or larger, depending on the intended application range.

The topological surface 33 presented by the alternating hills 32 and valleys 31 influences airflow below the load receiver 20. Airflows with flow lines having large transverse components are channelled in transverse direction. Airflows with flow line direction mainly in length direction in the valleys 31 are shielded against direct through-flow, by being guided upwards along the slope of the crossover from valley 31 to hill 32. Airflow from upwards, that is with flow lines mainly along gravity in the regions of the valleys 31 and being finally blocked by bottom of the valleys 31 arrive at a stagnation point, resulting in diverted flow lines receiving again a flow direction component against gravity obtained by deflection (length direction component), respectively undergo a channelling effect (transverse direction component).

Figure 6:
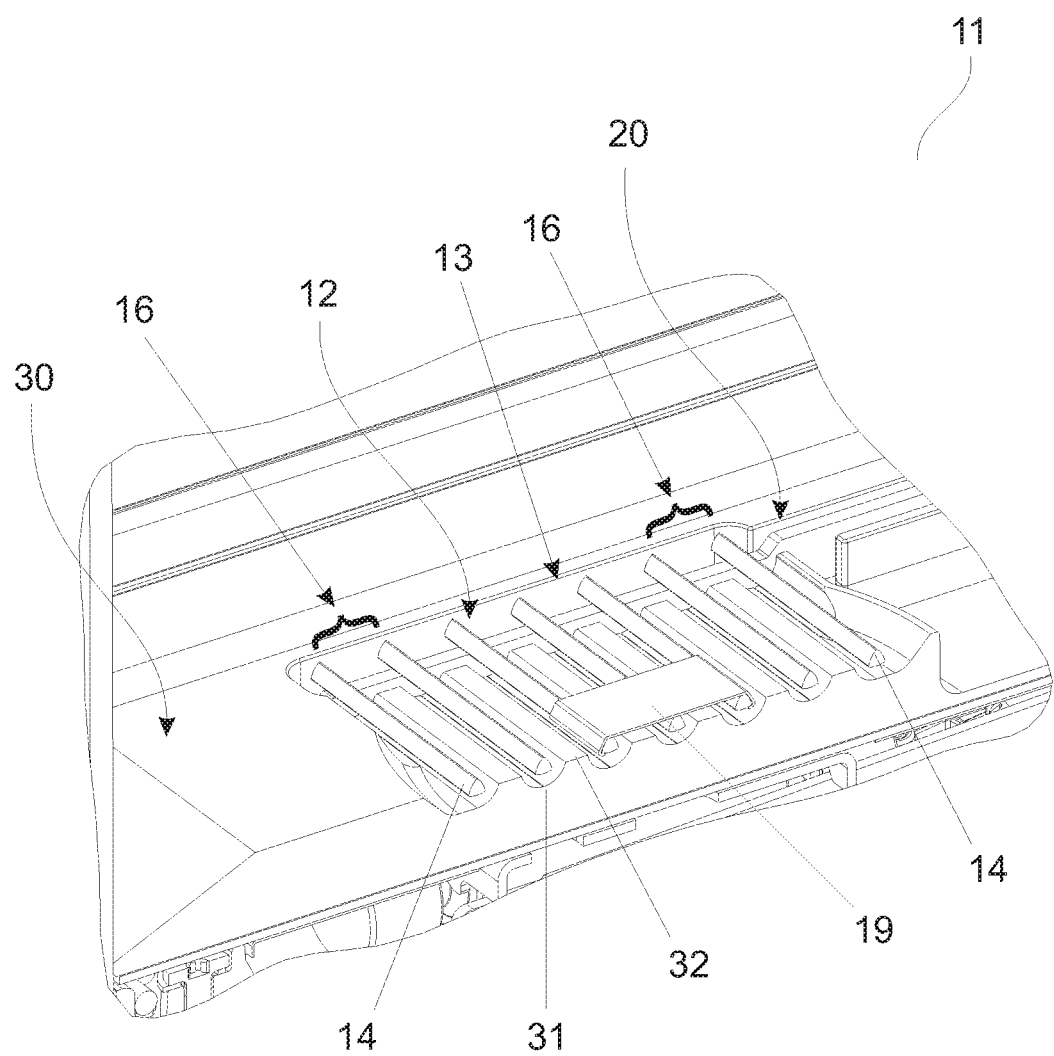
FIG. 6 is a perspective sectional view of the load receiving arrangement shown in FIG. 1.

The arrangement of the load receiver 20, as seen in the projection plane, within the circumferential portion 34 (35, 38, 39a, 39b, 39c) is arranged with respect to the topological surface 33 of the central portion 10 not arbitrarily but in correlation thereto. The grid structure 12 of the load receiver 20 is, as better visible in FIG. 6, in larger overlap with valleys 31 than with hills 32 (seen in the projection plane). In the embodiment shown in the figures, grid bars 14 of grid structure 12 run along the valleys 31 and are, as seen in length direction, roughly centred between two adjacent hills 32 (except for the outermost grid bars 14). Conversely, open areas of grid structure 12, designated in FIG. 6 with reference numeral 16, are correlated with regions of the topological surface 33 where hills 32 are arranged, covering also a cross-over region from valley 31 to hill 32 such that flow lines in a vertical projection plane (composed of height direction and longitudinal direction, which is the direction of alternation of hills and valleys) close to the surface of the topological surface 33 at the end of the guidance by the crossover valley-hill pass in their extension through a portion within open areas 16.

The cross-sectional form of grid bars 14 are also streamlined with respect to airflows in direction of gravity to avoid extended stagnation points at their upper surface. Moreover, in the exemplified embodiment, the grid bars 14 are embedded in the valleys 31 by having the height level of their underside face lower than the height level of adjacent hills 32. This configuration of the exemplified embodiment gives additional shielding effect against flow transversal to the extension direction of the grid bars 14. However, beneficial effects are achieved also via the correlation of grid structure 12 and topological surface 33 in the projection plane alone, even if the grid bars 14 are not embedded in valleys 31 when seen in height direction.

In the exemplified embodiment, the grid bars 14 are supported, close to their axial ends, by length bars 13 of the grid structure 12. The length bars 13 extend in length direction and form longitudinally extending arms of the sidebars 26 at their horizontal free end portion. These bars 13 are embedded in recess 37i of the windshield structure 30, with safety spacing to avoid any physical contact thereto.

It is understood that the invention is not restricted to the grid structure 12 shown in the exemplified embodiments. Other surface configurations of the load receiver 20 are considered, in particular also other kinds of grid structures 12.

Figure 4:
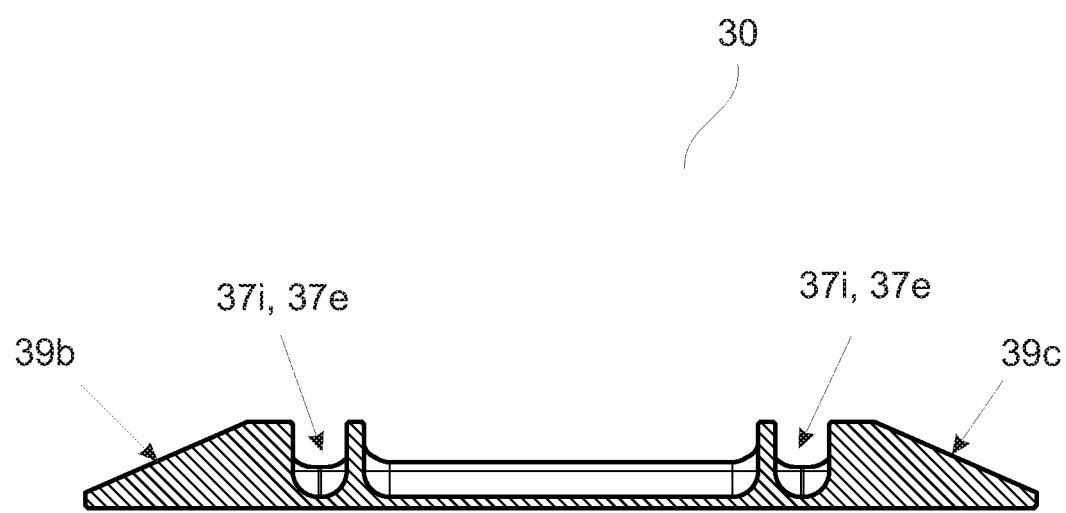
FIG. 4 shows, in a front sectional view, a windshield structure of the weighing balance shown in FIG. 2 and FIG. 3.

In case the specimen that is to be weighed is too small with respect to grid spacing, a clip 19 shown in FIG. 4 can be attached to the grid structure 12 to provide a sheet-like surface having larger contact area. It is understood that in case of specimen vessels without a suitable or complimenting bottom surface allowing a reliable standing of said vessel, a clip in the form of a special holder can be used. However, it is understood that (normal) sized specimen can be received by grid structure 12 as it is i.e. without clip 19. At least a pair of hills (32) adjoining one another comprises a chipped portion (52) for creating additional spacing between the load receiver (20) and the windshield structure (30). This arrangement helps in preventing any contact between the load receiver (20), particularly a clip (19) on the load receiver (20), and the hills (32) on the windshield structure (30).

Hills 32 and valleys 31 of the topological surface 33 are solidly connected to each other. Preferably, as shown in the exemplified embodiment, the topological surface 33 is made in one piece, and the central portion 10 is formed as a continuous surface. In the exemplified embodiment, the windshield structure 30 is made of one piece, for instance, by way of moulding using plastic material.

In the exemplified embodiment, the valleys 31 and crossover between valleys 31 and hills 32 are curved with a predetermined radius of curvature. However, different shapes of valley cross-sections and crossovers are considered. In the exemplified embodiment, the grid bars 14 in the grid structure 12 are evenly spaced apart. However, it is understood that the invention is not limited to such regular and evenly spaced arrangements. In the exemplified embodiment, the load receiving arrangement 11 is used with a weighing balance 100 according to the lateral load transfer type. However, it can also be applied for other types where, for example, load transfer is achieved vertically via vertical columns passing through one or more openings on the floor 46. For such embodiments, when using load receivers 20 with discontinuous contact surfaces, in particular irregularly spaced grid structures 12, it is preferred to use additional cover protection inhibiting accidental spillage from entering said through-holes on the floor 46.

As can be taken from the above, the invention is not limited to the exemplified embodiments described in the description and figurative description. Rather, the features discussed in the description and appearing in the subsequent claims can, standalone or in combination, be essential for the claimed invention.

REFERENCE SIGNS LIST

10 central portion
11 load receiving arrangement
12 grid structure
13 length bars
14 grid bars
16 open area of grid structure 12
19 clip
20 load receiver
26 sidebars
30 windshield structure
31 valleys
32 hills
33 topological surface
34 circumferential portion
35 wall of circumferential portion 34
36 collecting basin
37i, 37e recesses
38 plateau of circumferential portion 34
39 ramp portions of circumferential portion 34
39a ramp portion on front
39b, 39c ramp portion on sides
40 weighing chamber
41 front wall
42, 43 side walls
44 rear wall
45 top wall
46 floor
48 base body
50 operator panel
52 chipped portion on a pair of adjoining hills 32
60 weighing mechanism
80 height adjustable foot
100 weighing balance
H shield-height
Δh difference in height between circumferential portion 34 and topological surface 33

What is claimed is:

1. A weighing balance, comprising:
   a base body, positioned horizontal to a ground surface;
   a floor, attached to the base body and positioned horizontal thereto; and
   a load receiving arrangement, comprising:
   a load receiver, having a grid structure with open areas formed by a plurality of spaced apart grid bars, the load receiver adapted for receiving a load to be weighed; and
   a windshield structure, seated on the floor, positioned in a non-contacting manner below the load receiver to surround at least the grid structure, the windshield structure comprising a circumferential portion and a central portion, the central portion characterized by a topological surface to reduce airflow around the load receiver, the windshield structure having a plurality of alternating hills and valleys, with the hills corresponding in arrangement with the open areas of the load receiver and the valleys corresponding to the grid bars.

2. The weighing balance of claim 1, wherein a height difference between the alternating hills and valleys ranges between 1.2 mm and 16 mm.

3. The weighing balance of claim 1, wherein an average height difference between the adjacent alternating hills and valleys is between 1.2 mm and 16 mm.

4. The weighing balance of claim 1, wherein at least some of the valleys of the topological surface extend at least partially linearly.

5. The weighing balance of claim 1, wherein the hills and valleys are integrally formed with the circumferential portion.

6. The weighing balance of claim 1, wherein at least a pair of hills that adjoin one another comprises a chipped portion for creating additional spacing between the load receiver and the windshield structure.

7. The weighing balance of claim 1, further comprising:
   as a part of the circumferential portion, a pair of walls that extend in transverse direction of the windshield structure, the pair of walls located to oppose each other with the alternate valleys and hills located in between the two opposing walls;
   wherein each of the walls has an arcuate configuration for providing additional room to accommodate sample receivers that are marginally larger in size than size of the load receiver, and for easing removal of the load receiver from the load receiving arrangement.

8. The weighing balance of claim 1, further comprising:
   as a part of the circumferential portion, a plurality of ramp portions, with one of the ramp portions on a front of the circumferential portion, extending in a lateral direction of the windshield structure, and at least one of the ramp portions on each of at least two sides of the circumferential portion, extending in a longitudinal direction of the windshield structure.

9. The weighing balance of claim 8, further comprising:
   as a part of the windshield structure, recesses that extend in the longitudinal direction of the windshield structure, located on either side of the topological surface to separate the ramp portions on the sides from the topological surface, the recesses being are inwardly recessed for smooth conduct of fluids and for facilitating easy cleaning.

10. The weighing balance of claim 8, further comprising:
    as a part of the circumferential portion, a plateau, located in between the ramp portion on the front and the topological surface, such that weights or other weighing goods that require thermal stabilization are received on the plateau.

11. The weighing balance of claim 9, further comprising:
    as a part of the windshield structure, a collecting basin for receiving the fluid conducted through the recesses.

12. The weighing balance of claim 1, wherein the circumferential portion is higher, although by a small margin, than the topological surface.

13. The weighing balance of claim 1, further comprising:
as a part of the load receiver, two sidebars having an L-shaped configuration, the sidebars being held together in a spaced-apart manner by the grid structure.

14. A load receiving arrangement for a weighing balance having a weighing mechanism, the load-receiving arrangement comprising:
the load-receiving arrangement of claim 1, with the load receiver thereof operatively connected to the weighing mechanism.

* * * * *